United States Patent [19]

McManus

[11] Patent Number: 4,885,840
[45] Date of Patent: Dec. 12, 1989

[54] METHOD OF ATTACHING AN INSULATOR BLOCK WITH A T-SLOT TO A COIL

[75] Inventor: John R. McManus, Marcellus, N.Y.

[73] Assignee: Carrier Corporation, Syracuse, N.Y.

[21] Appl. No.: 279,686

[22] Filed: Dec. 5, 1988

Related U.S. Application Data

[63] Continuation of Ser. No. 92,815, Sep. 9, 1987, Pat. No. 4,807,488.

[51] Int. Cl.$^4$ .............................................. H05R 3/00
[52] U.S. Cl. ........................................ 29/611; 29/235; 29/451; 29/453
[58] Field of Search .................. 29/611, 621, 450, 451, 29/452, 453, 235; 174/138 J; 219/532, 374, 375, 376

[56] References Cited

U.S. PATENT DOCUMENTS

| | | | |
|---|---|---|---|
| 4,481,411 | 11/1984 | Roth | 219/532 |
| 4,528,441 | 7/1985 | Seal et al. | 219/532 |
| 4,531,017 | 7/1985 | Sherrill | 219/532 |

Primary Examiner—P. W. Echols
Attorney, Agent, or Firm—David J. Zobkiw

[57] ABSTRACT

A coiled resistance element is connected to an insulator block by sequentially locating and holding the coil in place; camming the coil such that two adjacent coils are forced together and the coils on either side are forced away so as to form two gaps or openings; and, inserting the arms of an insulator block into the two gaps so as to force the two adjacent coils into the cross bar portion of a T-slot formed in the connector block. Upon removing the camming forces from the coil, the two adjacent coils will be separated and located in the cross bar portion of the T-slot to thereby secure the coil and insulator together.

2 Claims, 4 Drawing Sheets

METHOD OF ATTACHING AN INSULATOR BLOCK WITH A T-SLOT TO A COIL

This application is a division of application Ser. No. 092,815, filed Sept. 9, 1987, now U.S. Pat. No. 4,807,488.

BACKGROUND OF THE INVENTION

Electrical resistance heating assemblies of the type employing a coiled resistance element require the manipulation of the coil with respect to the supporting electrical insulators. The insulators are secured to a tree or rack and support and locate the coil. Commonly assigned U.S. Pat. No. 4,528,441 discloses different insulator designs and one scheme for manipulating the coil and insulator to secure the coil in place. This scheme, however, is only suited for hand assembly and requires an individual manipulation for each attachment as the insulator must deform the coil to achieve attachment. Additionally, in hand assembly, there is a potential for securing the coil to an insulator at a location which can vary as to the number of turns of the coil.

SUMMARY OF THE INVENTION

A coiled resistance element is located on a fixture where it initially engages a blade portion of a cam member which goes into the space between two adjacent coils of the resistance element. The blade serves to locate and hold the coil in place. With the coil thus held in place, the cam member is then rotated. Two axially spaced wedge members initially enter the spaces between the coils separated by the blade and their respective adjacent coils. However, the circumferential overlapping of the blade and two wedge members extends over only a few degrees of rotation since the wedge members will then serve the locating and holding function. With the blade no longer separating the two coils, they are then forced together by the wedge members which also separate the next adjacent coils resulting in two enlarged gaps between adjacent coils on either side of the two coils forced together. The arms of the insulator block can then be inserted into the two gaps and the cam returned to its initial position removing the deforming forces on the coil which returns to its original shape while leaving the coil installed in place on the insulator.

It is an object of this invention to provide a method and apparatus for attaching coils to an insulator block.

It is another object of this invention to provide a method and apparatus for attaching coils to an insulator block without forcing the insulator block into place.

It is a further object of this invention to provide a method and apparatus which will accommodate coils of different diameters, pitch and wire size.

It is another object of this invention to provide a method and apparatus for locating, aligning and holding heater coils in position while the ceramic insulator blocks are inserted into the element.

It is a further object of this invention to provide a device which aligns and holds the correct number of coils in place for insulator block insulation without requiring deforming the heater coils by the insulator block.

It is an additional object of this invention to provide an adjustable device which can accommodate coils of different diameters. These objects, and others as will become apparent hereinafter, are accomplished by the present invention.

Basically, a cam member is provided with a blade portion having a first circumferential extent and two wedge members located on either side of and spaced from the blade and having a second circumferential extent which is coextensive with the first circumferential extent for only a few degrees. Initially, the blade goes between two coils of the heating coil thereby locating and holding the heating coil in place. Rotation of the cam member brings the wedge members into engagement with the outer portions of the coils being separated by the blade. As the blade moves out of contact, the two wedge members cam the two formerly separated coils together and simultaneously cam away the coils adjacent the two formerly separated coils thereby producing a pair of wide gaps located on either side of the two coils. The arms of the insulator block can then be readily inserted into the two gaps with the two coils going into the T-slot. Reversing the cam permits the coil to return to its original shape and to be secured to the insulator block.

BRIEF DESCRIPTION OF THE DRAWINGS

For a fuller understanding of the present invention, reference should now be made to the following detailed description thereof taken in conjunction with the accompanying drawing wherein.

DESCRIPTION OF THE PREFERRED EMBODIMENT

Figure 1:
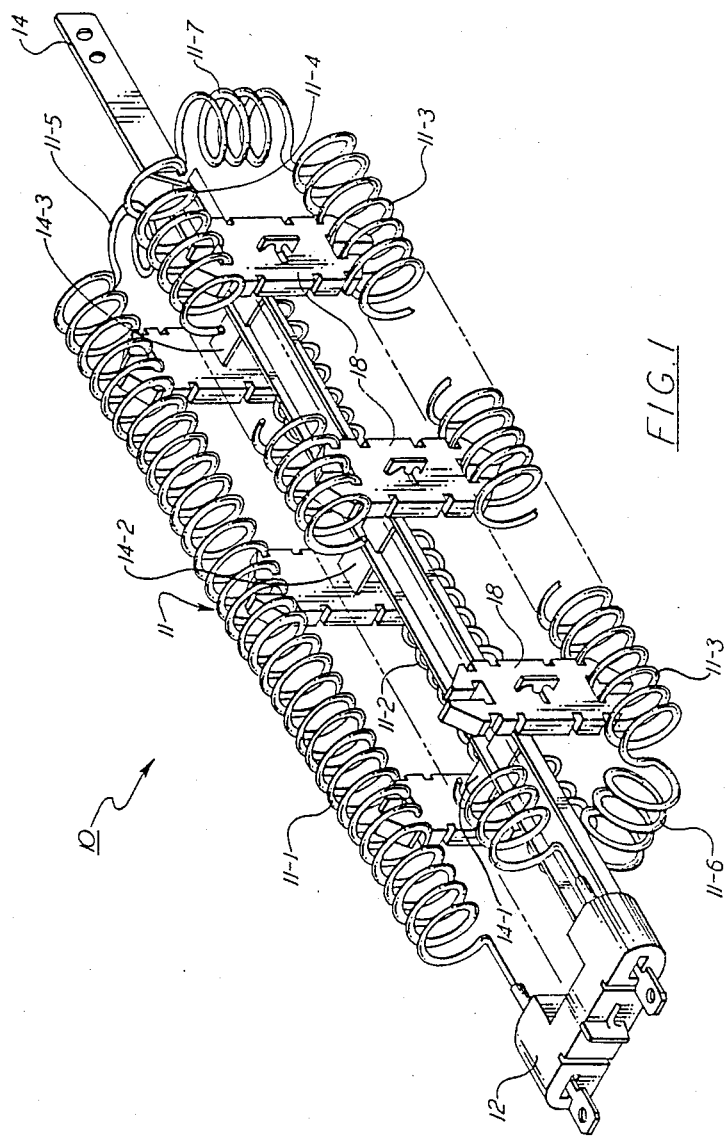
FIG. 1 is a perspective view of an assembled coil.
Figure 2:
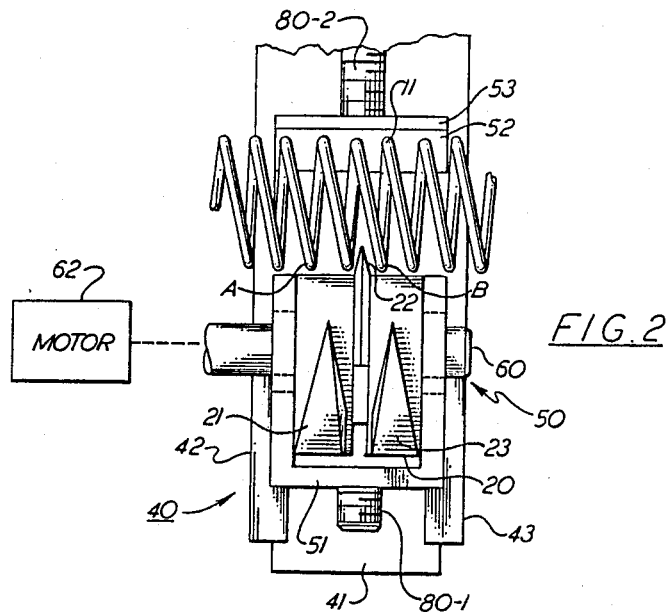
FIGS. 2–4 show the sequential coaction between the coil and the cam.
Figure 3:
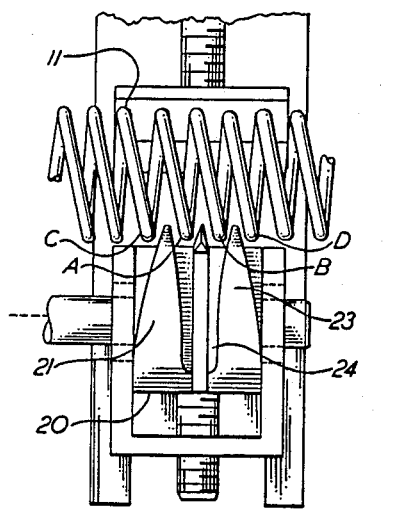
Figure 4:
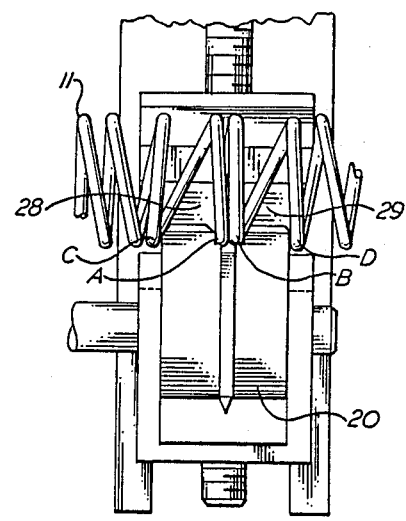
Figure 5:
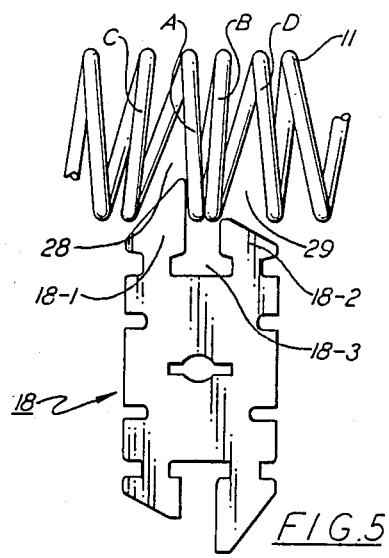
FIG. 5 illustrates the securing of the coil to the insulator block.
Figure 7:
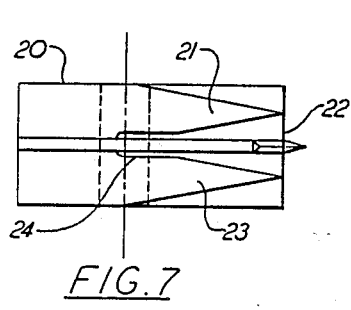
FIG. 7 is a developed view of the cam taken along line 7—7 of FIG. 6.
Figure 6:
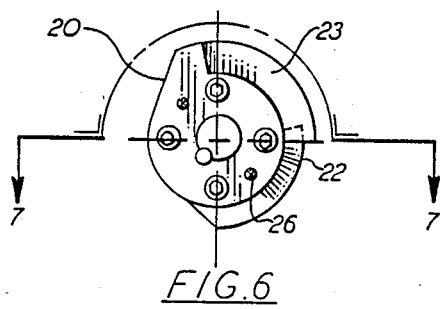
FIG. 6 is side view of the cam.

In FIG. 1, the numeral 10 generally designates an electric resistance heating coil. The wire coil 11 is made up of four long legs or branches 11-1 to 4 connected by short legs or branches 11-5 to 7 and terminates in spade plug 12. Coil 11 is supported on tree or rack 14 by a plurality of ceramic insulators 18 which are located on the ends of branches 14-1 to 3 of the rack. The sequential steps for the attachment of the coil 11 to insulators 18 are illustrated in FIGS. 2–5. The key element in the attachment process is cam 20 which is also shown in FIGS. 6 and 7. Cam 20 is made up of three portions which are preferably made separately and then secured together by dowels or the like 26. The central portion defines a blade 22 having a circumferential extent of approximately 120°. On either side of blade 22 are mirror image wedge members 21 and 23 which extend outwardly a greater radial distance than blade 22 as best shown in FIG. 6. However, the blade 22 and wedge members 21 and 23 have only a few degrees of circumferential overlap, and preferrably 10°, or less. As best shown in FIGS. 3 and 7, members 21–23 together define a slot 24 which has a rounded end which serves as a stop as will be explained below. Referring now to FIG. 2, the coil 11 is moved with respect to cam 20 such that blade 22 enters between two coils A and B of coil 11 to thereby fix the coil 11. Upon rotation of cam 20 to the FIG. 3 position, the wedge members 21 and 23 will enter between the coils A and C, and B and D, respectively, while blade 22 remains between coils A and B. Further rotation of cam 20 from the FIG. 3 position to the FIG. 4 position sequentially moves blade 22 past coil 11 thereby permitting wedge members 21 and 23 to cam coils A and B inwardly and to cam coils C and D outwardly. Coils A and B are forced into slot 24 but cam 20 cannot rotate past the point where coils A and B engage the bottom of slot 24 or where coils A and B reach an interference fit with slot 24. In the extreme position where coils A and B are at or near to the bottom of slot 24, enlarged openings 28 and 29 are formed between coils C and A, and B and D, respectively. Because openings 28 and 29 are formed by displacing coils A–D, the openings 28 and 29 have a circumferential extent. So, 90° from the position of cam 20 with respect to coil 11, as illustrated in FIG. 4, the insulator block 18 can be inserted as illustrated in FIG. 5. Specifically, barbed or arrowhead shaped arms 18-1 and 18-2 can be inserted into openings 28 and 29, respectively. With arms 18-1 and 18-2 inserted into openings 28 and 29, coils A and B pass into T-slot 18-3 until they reach the cross bar portion of T-slot 18-3. If then the cam 20 is reversed to the FIG. 2 position, coils A and B will be at the ends of the cross bar portion of T-slot 18-3 as best illustrated in FIG. 1.

Figure 9:
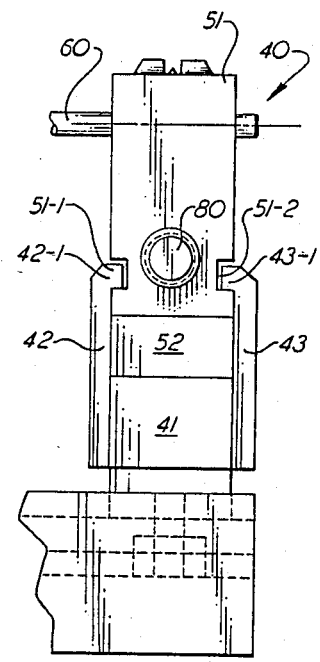
FIG. 9 is an end view of the adjustable coil retainer and spreader.
Figure 8:
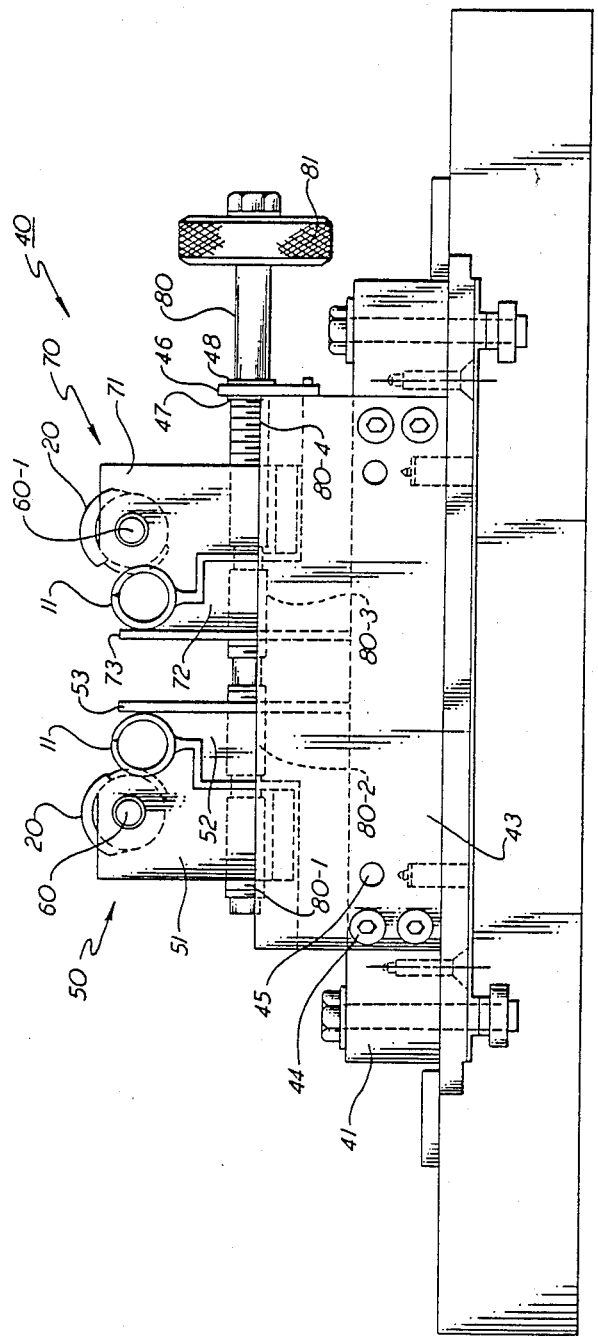
FIG. 8 is a view of the adjustable coil retainer and spreader.

The adjustable coil retainer and spreader is best shown in FIGS. 2, 8 and 9 and is generally indicated by the numeral 40. Retainer and spreader 40 has a base 41. Side plates 42 and 43 have flanges 42-1 and 43-1, respectively, and are suitably secured on opposite sides of base 41 by bolts or the like 44 and dowels 45. Located between side plates 42 and 43 and guided by flanges 42-1 and 43-1 are a pair of V-block assemblies 50 and 70. V-block assembly 50 includes outer V-block 51 and inner V-block 52 which coact to form a V-shaped recess for receiving coil 11. Inner V-block 52 carries a V-block backup plate 53 which is bolted or otherwise suitably secured in place. Outer V-block 51 supports shaft 60 which, in turn, has cam 20 secured thereto. Motor 62 which may be an electric motor or a hydraulic motor such as a hydraulic cylinder drives shaft 60 and thereby cam 20. However, if necessary, or desired, motor 62 can be replaced with a handle, etc. for manually rotating shaft 60. Similarly, V-block assembly 70 includes outer V-block 71 and inner V-block 72 which coact to form a V-shaped recess for receiving coil 11. Inner V-block 72 carries a V-block backup plate 73 which is bolted or otherwise suitably secured in place.

Outer V-block 71 supports shaft 60-1 which, in turn, has cam 20 secured thereto. A motor (not illustrated) drives shaft 60-1 and thereby cam 20. However, motor 62 could be arranged to drive both shaft 60 and shaft 60-1, or shaft 60-1 could be manually rotated by a handle or the like.

As noted above, members 51, 52, 71 and 72 are guided by flanges 42-1 and 43-1, however, this is only illustrated for outer V-block 51 in FIG. 9. Specifically, grooves 51-1 and 51-2 are formed in outer V-block 51 and receive flanges 42-1 and 43-1, respectively, which guide member 51 in its movement. Movement of members 51, 52, 71 and 72 is achieved through the rotation of shaft 80. Shaft 80 extends through a bore in end plate 46 which is attached to side plates 42 and 43 by bolts or other suitable means. Shaft 80 has a pair of annular grooves which receive snap rings 47 and 48 for maintaining shaft 80 in place. Shaft 80 has four threaded portions 80-1 to 4 of the same pitch but of alternating pitch directions which respectively coact with members 51, 52, 71 and 72. Shaft 80 is rotated by handle 81 or, if necessary or desired, may be motor driven. Rotation of shaft 80 acts the same on V-block assemblies 50 and 70 such that if V-block assemblies 50 and 70 are closing or narrowing between the members of the respective assemblies, the assemblies 50 and 70 are also moving towards each other. Similarly as members 51 and 52 and members 71 and 72 move apart, assemblies 50 and 70 move apart. The movement of assemblies 50 and 70 with respect to each other as well as the movement of members 51, 52, 71 and 72 permits V-block assembly 50 to accommodate coils 11 of a range of different diameters and of a range of different spacings between the various branches of coil 11. This is because as members 51 and 52 and members 71 and 72 move from their closest position in which they form a V with a point through the various truncated V's, such as the intermediate position illustrated in FIG. 8, the center of the coil 11 can be maintained at the same centerline and therefore properly positioned with respect to cams 20. Backup plates 53 and 73 serve to help keep the various sized coils within the V's of the V-block assemblies.

With V-block assembly 50 adjusted through shaft 80 to accommodate a coil 11, the placing of the coil into the spacing between members 51 and 52 and between members 71 and 72 corresponds to FIG. 2. Rotation of cams 20 sequence coil 11 through the positions illustrated in FIGS. 3 and 4. Then, as illustrated in FIG. 5, arms 18-1 and 2 of insulator block 18 may be inserted into gaps 28 and 29 and the cams 20 reversed leaving coils A and B installed in the cross bar portion of T-slot 18-3.

Although a preferred embodiment of the present invention has been illustrated and described, other changes will occur to those skilled in the art. For example, other forms of a cam may be used with reciporcal rather than rotary movement. It is therefore intended that the scope of the present claim is to be limited only by the scope of the appended claims.

What is claimed is:

1. A method for attaching an insulator block having at least one pair of arms with a T-slot including a cross bar located between the pair of arms to a coil including a plurality of loops comprising the sequential steps of:
    fixedly locating the coil;
    selecting a pair of loops of the coil having at least one loop on each side of the selected pair of loops;
    forcing the selected pair of loops together by the application of force while forcing the at least one loop on each side of the selected pair of loops away from the selected pair of loops by the application of force so as to create a pair of openings;
    putting one pair of arms of the insulator block into the previously created pair of openings such that the selected pair of loops is forced into the cross bar of the T-slot formed in the insulator block; and
    after the selected pair of loops is forced into the cross bar, releasing the forces acting on the selected pair of loops and on at least one loop on each side of the selected pair of loops.

2. The method of claim 1 wherein the steps of fixedly locating the coil and forcing the selected pair of loops together are sequentially achieved by rotation of a cam member.

* * * * *